(12) United States Patent
Marx et al.

(10) Patent No.: US 7,477,401 B2
(45) Date of Patent: Jan. 13, 2009

(54) TRENCH MEASUREMENT SYSTEM EMPLOYING A CHROMATIC CONFOCAL HEIGHT SENSOR AND A MICROSCOPE

(75) Inventors: David S. Marx, Westlake Village, CA (US); David L. Grant, Thousand Oaks, CA (US)

(73) Assignee: Tamar Technology, Inc., Newbury Park, CA (US)

( * ) Notice: Subject to any disclaimer, the term of this patent is extended or adjusted under 35 U.S.C. 154(b) by 339 days.

(21) Appl. No.: 11/261,284

(22) Filed: Oct. 28, 2005

(65) Prior Publication Data

US 2006/0109483 A1 May 25, 2006

Related U.S. Application Data

(60) Provisional application No. 60/631,226, filed on Nov. 24, 2004.

(51) Int. Cl.
*G01B 11/24* (2006.01)
(52) U.S. Cl. .................................................... 356/609
(58) Field of Classification Search ................ 356/609
See application file for complete search history.

(56) References Cited

U.S. PATENT DOCUMENTS

| 4,585,349 | A |   | 4/1986 | Gross et al. |
| 5,785,651 | A | * | 7/1998 | Kuhn et al. ............... 600/310 |
| 5,790,242 | A | * | 8/1998 | Stern et al. ................ 356/4.04 |
| 5,963,314 | A | * | 10/1999 | Worster et al. ........... 356/237.2 |
| 6,038,066 | A |   | 3/2000 | Baumann |
| 6,188,514 | B1 |   | 2/2001 | Saito et al. |
| 6,580,502 | B1 | * | 6/2003 | Kuwabara ................ 356/237.3 |
| 6,674,562 | B1 |   | 1/2004 | Miles |
| 6,674,572 | B1 | * | 1/2004 | Scheruebl et al. ........... 359/368 |
| 6,917,421 | B1 | * | 7/2005 | Wihl et al. ............... 356/237.5 |
| 6,934,019 | B2 | * | 8/2005 | Geffen et al. ............ 356/237.4 |
| 7,205,531 | B2 | * | 4/2007 | Watanabe et al. ........... 250/234 |
| 2001/0007498 | A1 | * | 7/2001 | Arai et al. .................... 356/401 |
| 2004/0109170 | A1 | * | 6/2004 | Schick ....................... 356/614 |
| 2005/0030528 | A1 | * | 2/2005 | Geffen et al. ............ 356/237.1 |

FOREIGN PATENT DOCUMENTS

JP         2006235250 A  *  9/2006

\* cited by examiner

*Primary Examiner*—Roy M Punnoose
(74) *Attorney, Agent, or Firm*—Leonard Tachner

(57) ABSTRACT

A system for the measurement of high aspect ratio trenches. The preferred embodiment consists of three elements: a) an integrated microscope and optical height sensor, b) an axially dispersive, afocal lens system, which is included in the optical height sensor, and c) an algorithm for processing the optical height sensor data to produce the depth of the high aspect ratio trench. The present invention combines a traditional imaging microscope with a chromatic confocal, single point, height sensor. This combination instantaneously provides an image of the object and the height value at one point in the image. No mechanical movement is necessary anywhere in the system to achieve that result. The chromatic confocal height sensor is integrated with a traditional microscope through the use of separate wavelength bands such as a wavelength band in the visible part of the spectrum, and a wavelength band in the infrared or ultraviolet part of the spectrum.

10 Claims, 5 Drawing Sheets

---- blue light (500nm)
........... red light (700nm)

TRENCH MEASUREMENT SYSTEM EMPLOYING A CHROMATIC CONFOCAL HEIGHT SENSOR AND A MICROSCOPE

CROSS-REFRENCE TO RELATED APPLICATIONS

This application takes priority from provisional application Ser. No. 60/631,226 filed on Nov. 24, 2004.

FIELD OF THE INVENTION

The present invention relates generally to an instrument and method for the measurement of high aspect ratio trenches at a micrometer or submicrometer scale. The invention pertains more specifically to a system and related method using in combination a microscope and a chromatic confocal single point optical height sensor.

BACKGROUND ART

Many advanced semiconductor fabrication processes involve the construction of high aspect ratio trenches on the micrometer or sub-micrometer scale. For example, micro-electro-mechanical systems (MEMS), which often contain moving parts a few microns wide, are characterized by deep vertical etching processes. The product contains three-dimensional structures with regions of deep, narrow trenches with near-vertical sidewalls. A typical example is a trench etched 5 microns wide by 100 microns deep. MEMS devices with these characteristics include sensors, actuators, and RF devices such as inductors and comb switches. All of these devices characteristically require deep vertical etching processes to separate moving mechanical parts, and finger-like features are very common. Manufacturers of MEMS devices do not currently have an accurate and inexpensive method to non-destructively measure the depth of etched high aspect ratio trenches. They need to have precise control over etch depth to produce a working device, and the measurement of etch depth is very important for process development and control. Current metrology technology cannot measure the depth of high aspect ratio trenches with speed and accuracy. Thus, the development of a non-contact metrology instrument that quickly and accurately measures the etched depth of high aspect ratio trenches, such as those formed by narrow finger-like structures, would greatly benefit MEMS manufacturers in process development and control.

Because of the very steep sidewalls inherent in such a structure, profiling instruments that use a stylus or other method of contact cannot accommodate an aspect ratio or lateral dimension of this nature. For example, atomic force microscopes (AFM) and stylus profilers are not suitable because even if the tip could penetrate the trench, it would not be able to follow the side wall, and the tip would break when exiting the trench. Standard non-contact optical instruments for measuring surface height are confocal microscopes, white light interferometers, phase shift interferometers, and triangulation techniques. Standard confocal microscopes fail because they confuse the signal from the top of the trench with the signal from the bottom when the trench is too narrow. When the width of the trench approaches the size of the source pinhole, as much or more light will be detected when the focus is on top of the trench as when it is at the bottom. Thus, a confusing signal is generated even when the bottom of the trench is far away from the focal plane. Confocal microscopes are also very slow since they require scanning the measurement sample longitudinally to find the plane of best focus. White light interferometers have similar difficulties in that they are slow and must scan longitudinally. In addition, the fringe signal is weak due to the light scattered from the walls and the top. Phase shift interferometers fail outright because phase unwrapping fails at steep sidewalls. Finally, triangulation techniques can only succeed if precise control of the direction of the incident beam relative to the direction of the trench is maintained so that the light can get into the trench from the side. This constraint makes such an instrument unfeasible.

The prior art is extensive for chromatic confocal sensors. In "Focus-Wavelength Encoded Optical Profilometer," Optics Communications, Vol. 49, No. 4, p. 229, Mar. 15, 1984 by Molesini, et. al, a chromatic confocal system where the dispersive lens is a piano-convex singlet is described. The singlet forms a focused spot which is reimaged onto the object by a microscope objective. This system has the disadvantage that the microscope objective is used with a short, finite conjugate. Most microscope objectives are designed for long conjugates of 180 mm, 200 mm, or infinite. Thus, Molesini's system does not allow simultaneous imaging of the object and height profiling of the object. In addition, this system is not truly confocal, since it lacks an aperture in an image plane for the reflected light.

Chromatic confocal systems that provide an image by utilizing a rotating perforated disc are described by Scheruebl et. al. in U.S. Pat. No. 6,674,562, and in Saito et al in U.S. Pat. No. 6,188,514. A spectrometer is used in Scheruebl's system to quantitatively measure the height at a single point, and the measurement is then used as feedback for autofocus. Saito's system does not use a spectrometer, and the height-color information is only for subjective viewing. Both of these systems use the same source for image formation and for the height measurement. Since the single source is spread over the entire field of view, and then spread again in wavelength by the dispersion, these systems require very bright and expensive light sources, such as mercury arc lamps. Alignment, cost, and complexity are all well-known difficulties with perforated disc type confocal microscopes, which tend to be very expensive.

While Molesini used a refractive lens to provide the axial dispersion, Gross et al in U.S. Pat. No. 4,585,349, describe a chromatic confocal height measuring sensor that uses a holographic element to provide the axial dispersion. It includes a pinhole and a diffraction grating to detect the height signal. The holographic element serves the dual purpose of causing axial dispersion as well as focusing the light onto the object. A different holographic element is required for each desired spot size and measurement range. In addition, the difficulty of fabricating a well-corrected holographic element with large numerical aperture suggests that a small spot size would be difficult to achieve.

A holographic element is one type of diffractive lens. Another type is a zone plate. In "Diffractive Lenses for Chromatic Confocal Imaging," Applied Optics, Vol. 36, No. 20, p. 4744, 1997 by Dobson et al, describes a zone plate with a positive refractive lens and a microscope objective lens to form a chromatic confocal system.

Baumann in U.S. Pat. No. 6,038,066 discloses an afocal dispersive system inserted in the infinite conjugate region of a confocal microscope. However, the considerations behind Baumann's design and the present invention are different. Baumann's design provides a small amount of predetermined axial dispersion. For example, the axial range of focus for a 200 nm wavelength band with a 20× microscope objective is about 25 µm. The present invention is designed for a much greater range of focus. For example, the axial range of focus for the present invention in the same condition is 200 µm. Baumann's design is well corrected for transverse chromatic aberrations, curvature, coma, astigmatism, and distortion. The off-axis aberrations are important in Baumann's design because it is intended for use with a scanning, imaging, confocal microscope, such as those that use a rotating Nipkow disc. However, the present invention is designed for a single point height measurement sensor, and so the off-axis aberrations are not a chief consideration.

The principles of confocal microscopes are described in "Confocal Scanning Optical Microscopy and Related Imaging Systems", Academic Press, 1996 by Corle et al. A confocal microscope begins with a pinhole at the source, which is imaged onto the object. The objective lens images the object spot onto another, sometimes the same, pinhole before a detector. If the object is out of focus, then the re-imaged spot will be out of focus at the detector pinhole. As a consequence, the light power at the detector is maximum when the object is exactly in the focal plane of the objective, and when the object is out of focus, most of the light power is blocked by the detector pinhole. If the object is scanned axially through focus, the axial position where the detector power is maximum can be recorded, thereby measuring the surface height of the object. The final result is that a confocal microscope provides an intensity signal corresponding to the surface height of the object.

None of the above prior art addresses the measurement of a narrow, high aspect ratio trench. Neither does any of the prior art use separate wavelength bands to integrate a chromatic confocal height sensor with a traditional reflection microscope.

SUMMARY OF THE INVENTION

The present invention comprises a system that solves the problems related to the measurement of high aspect ratio trenches. The preferred embodiment consists of three elements: a) an integrated microscope and optical height sensor, b) an axially dispersive, afocal lens system, which is included in the optical height sensor, and c) an algorithm for processing the optical height sensor data to produce the depth of the high aspect ratio trench.

The present invention combines a traditional imaging microscope with a chromatic confocal, single point, height sensor. This combination instantaneously provides an image of the object and the height value at one point in the image. No mechanical movement is necessary anywhere in the system to achieve that result. However, if height measurements are required in multiple locations, lateral mechanical movement can be used to move the height measuring spot to those locations. Since the image shows precisely the desired lateral locations, the mechanical movements can be fast.

The optical height sensor used in the present invention employs the chromatic confocal technique. This method is known in the art for measuring surface topography. It uses axial chromatic aberration, also referred to as axial dispersion, with a broadband source to form a focused spot such that the axial distance to the focus varies with wavelength. Thus, only one wavelength will be in focus on the object, and the height of the object determines which wavelength is best focused. Upon reflection from the object, the light is refocused onto a small detector aperture, such as a pinhole or the end of an optical fiber. The wavelength that is best focused on the object will also be the only wavelength best focused on the detector aperture. Therefore, the signal level will be greatest for the wavelength corresponding to the height of the object. A spectrometer at the detector measures the signal level for each wavelength.

The chromatic confocal height sensor is integrated with a traditional microscope through the use of separate wavelength bands. For example, the height sensor might use a wavelength band in the visible part of the spectrum, and the microscope might use a wavelength band in the infrared or ultraviolet part of the spectrum. This invention includes designs that integrate the height sensor and microscope into a single system without any cross interference.

Typically, when the object is a simple surface, the chromatic confocal sensor provides a response as shown in FIG. 1. In this figure, the horizontal axis is wavelength or object height, and the vertical axis is signal level. Typical chromatic confocal sensors use a simple peak detection algorithm to find the wavelength, and corresponding object height, at which the signal level is maximum. However, in the case of a high aspect ratio trench, particularly when the width of the trench is near the width of the focused spot or smaller, the simple peak detection algorithm will fail. The reason for the failure is that when the opening is as small as the focused spot, then significant light will reflect from the top of the trench, even when the spot is centered over the trench. Also, the wavelength that is best focused at the bottom of the trench is necessarily unfocused at the top of the trench, so that the top of the trench will prevent a significant amount of the light from reaching the bottom of the trench. However, some small amount of light does reach the bottom of the trench. The end result is that the spectrometer signal has the characteristic shown in FIG. 2.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF A PREFERRED EMBODIMENT

Figure 3:
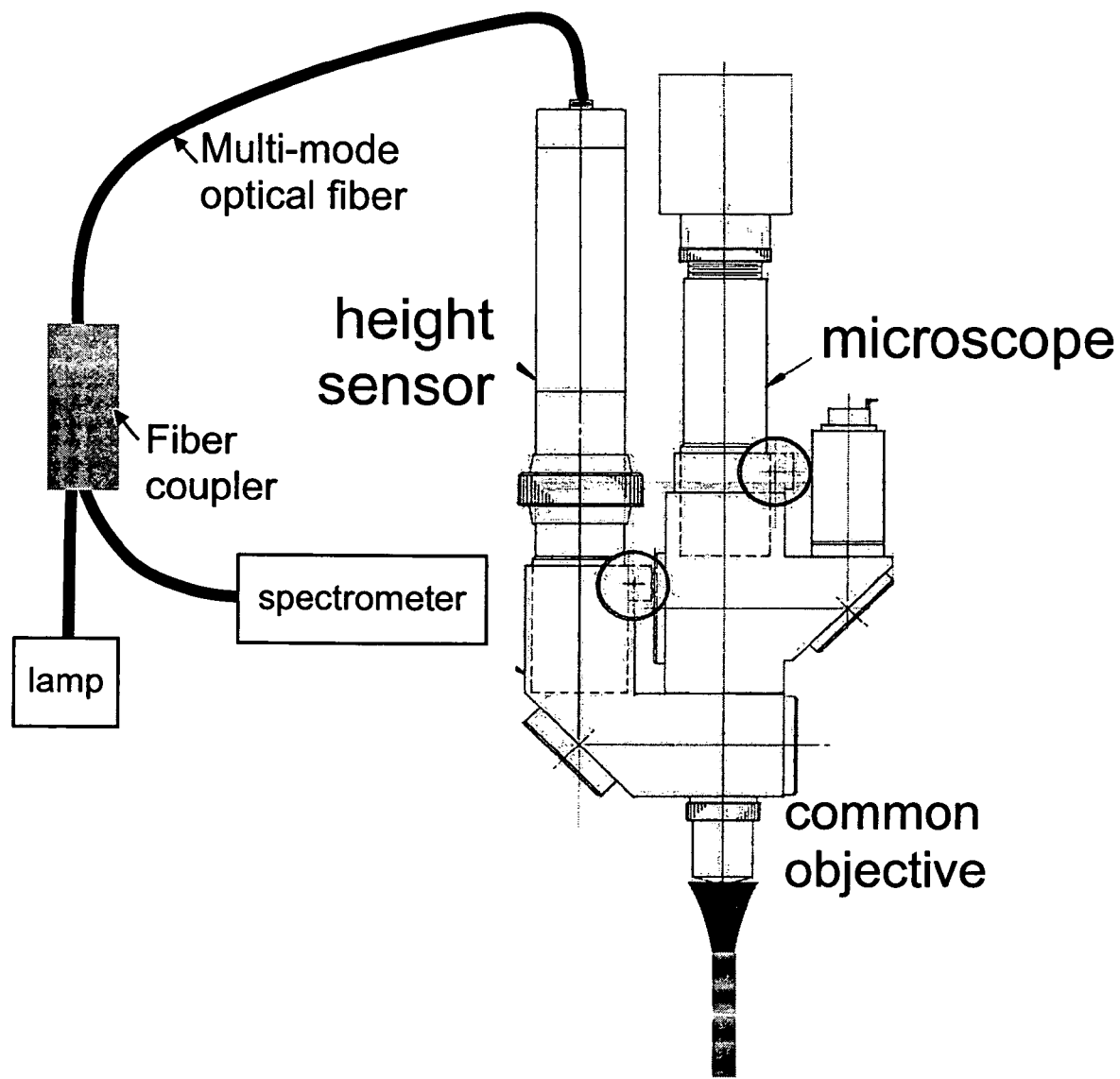
FIG. 3 is a view of the integrated chromatic confocal height sensor and microscope system of the invention.

The present invention integrates a simple and inexpensive chromatic confocal height sensor with a simple and inexpensive microscope (FIG. 3). The combination creates a system that measures the height of the object at one location in the microscope's field of view, while simultaneously providing a traditional microscope image indicating exactly the location on the object where the height measurement occurs. In addition, this invention includes a method for using the integrated system to measure the depth of a high aspect ratio trench.

One object of the present invention is to combine a traditional imaging microscope with a chromatic confocal, single point, height sensor. This combination instantaneously provides an image of the object and the height value at one point in the image. No mechanical movement is necessary anywhere in the system to achieve that result. However, if height measurements are required in multiple locations, lateral mechanical movement can be used to move the height measuring spot to those locations. Since the image shows precisely the desired lateral locations, the mechanical movements can be fast.

This system can also replicate a traditional stylus profiler, but with a non-contact, optical height measurement. A traditional stylus profiler drags a stylus in one direction across the object, measuring the object height along that single direction. Typically, a stylus profiler includes a crude imaging device to show the location of the stylus on the part. However, the imaging device is typically at a large angle relative to the object, and as a result, the image is difficult to use quantitatively for location analysis.

While prior art chromatic confocal devices typically use a single dispersive lens to provide both the axial dispersion as well as the focusing of the light onto the object, the chromatic confocal height sensor incorporated in this invention uses a dispersive lens separate from the objective lens. The objective lens is then free to perform both the imaging required for the microscope and the focusing required for the height sensor. The dispersive lens used in this invention is afocal and can be used with any objective lens. Objective lenses, such as microscope objective lenses, are available off-the-shelf with very high quality and in a wide range of numerical apertures and focal lengths. In addition, rotating nosepieces to easily replace one objective lens with another are common in standard microscopes. A single afocal dispersive lens, when included with a standard objective lens, will convert any objective lens into an axially dispersive lens as required for a chromatic confocal system. The objective lens can be chosen according to the desired height measurement range and resolution. Thus, design time, cost, and performance improve when using an afocal dispersive lens because only a single non-standard lens design is required. Two different afocal, axially dispersive lenses, intended to be part of a chromatic confocal system, are one of the subjects of this invention.

This afocal dispersive lens system may be refractive, or it may include a diffractive element. The refractive system consists of two identical doublets spaced by a distance approximately equal to twice the doublet's working distance. The doublet is designed to provide a fixed amount of axial dispersion, while also corrected for spherical and coma aberrations. The design of achromatic doublets is well-known and is described in many textbooks on the subject, such as in "Modern Optical Engineering", $3^{rd}$ Edition, McGraw-Hill, 2000 by Smith. A typical achromatic doublet uses a low index, low dispersion positive lens combined with a high index, high dispersion negative lens to produce a doublet that has zero spherical aberration, zero coma aberration, and zero chromatic aberration. The present invention uses a similar design method, but reverses the roles of the elements. In the present invention, the positive element is made from a high index, high dispersion glass, while the negative lens is made from a low index, low dispersion glass. In this case, the lens parameters can be solved to produce zero spherical aberration, zero coma aberration, and a fixed, desired amount of axial chromatic aberration (dispersion).

Axial dispersion of a singlet or closely spaced doublet is closely related to the lens's power, or focal length. Therefore, it is difficult to design an afocal dispersive lens as a singlet or doublet. Thus, the present invention uses two dispersive doublets spaced apart. The first doublet adds dispersion and forms a focus, while the second doublet adds more dispersion and approximately collimates the beam. Obviously, since the output beam contains axial dispersion, it is collimated at only one wavelength, the nominal wavelength. At wavelengths shorter than the nominal, the output beam is slightly converging, and at wavelengths longer than the nominal, the output beam is slightly diverging. In addition, the system is perfectly corrected for spherical and coma aberrations at only the nominal wavelength. However, through proper design and choice of glass types, the aberrations at the other wavelengths can be kept small.

A second approach to create an afocal, axially dispersive lens is to use a diffractive positive element combined with a negative refractive element. In this system, the dispersion of the positive element and the dispersion of the negative element are additive. Thus, only one such doublet is needed to create an afocal system with sufficient dispersion. The dispersion of the diffractive element is also large enough that a relatively low power negative lens is sufficient, thereby keeping spherical and coma aberrations small.

The invention also includes a method for using the integrated system for the measurement of high aspect ratio trenches when the height measurement location is centered over a trench. The technique is to correlate the confocal response to a priori information about the structure of the sample. For example, if the area being measured consists of broad flat regions, then the standard confocal response is to be expected. If the region consists of narrow trenches, then a non-standard confocal response is to be expected. The integrated microscope provides a two-dimensional microscope image of the area around the chromatic confocal measurement spot. This image provides information about the object. If the image shows no features, then trench objects must not be present. If the image shows narrow line features, then the possibility of trench objects exists. Furthermore, the microscope image can be analyzed to provide an estimate of the width of the line object. The width information, along with any other a priori information such as the object's material, can be used to predict the nature of the confocal response when the confocal spot is centered over the object. For example, a response similar to that shown in FIG. 2 can be expected if the width of the line is less than the confocal spot size.

The obvious question raised by this confocal approach is: what is the nature of the confocal response for a high aspect ratio trench structure, and is there enough signal to differentiate the bottom of the trench? When an incident beam has a focal plane corresponding to the bottom of the trench, the beam will be much wider at the top. Obviously, the confocal signal from the bottom of the trench can result only from the light focusing in the direction along the trench. All the light intercepted by the top of the trench will be filtered out by the detector pinhole. Therefore, although the confocal signal exists for the bottom of the trench, its amplitude is diminished.

Figure 4:
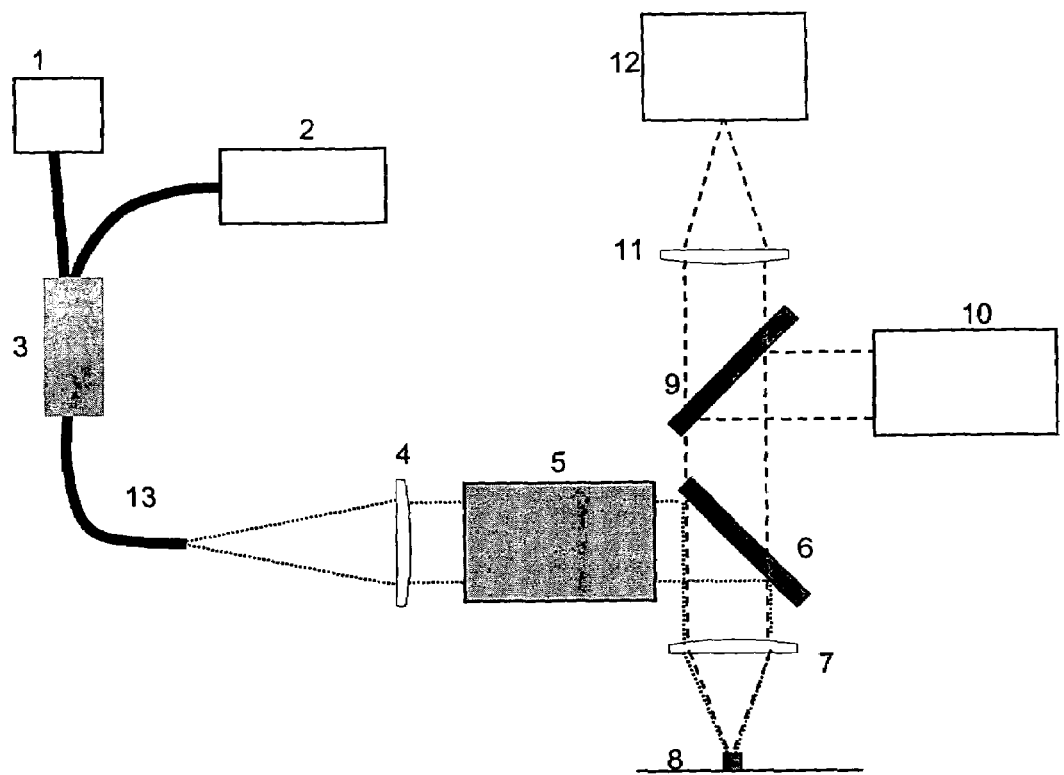
FIG. 4 is a schematic diagram of the integrated height sensor and microscope.

FIG. 4 shows a schematic layout of the integrated height sensor and microscope. The broadband source 1 is coupled into an input fiber of the fiber optic splitter 3. The fiber optic splitter can easily be replaced with a bulk optic beam splitter, but the use of a fiber optic splitter allows for more flexibility and compactness in the system layout. The in/out fiber 13 of the splitter 3 emits a diverging beam, which is collimated by the collimating lens 4. The afocal dispersive lens 5 adds axial dispersion to the collimated beam, and the beam exiting the afocal dispersive lens 5 is collimated at the center wavelength, slightly diverging at the long wavelength, and slightly converging at the short wavelength of the useful band. The beam splitter 6 has chromatic dependence so that it reflects the wavelength band used by the height sensor and transmits the wavelengths used by the microscope. The reflected light from the beam splitter 6 is focused by the objective lens 7 onto the object 8. Since the divergence of the light entering the objective lens is wavelength dependent, the axial distance from the objective lens to the focal plane is also wavelength dependent. Short wavelengths will focus closer to the lens than longer wavelengths.

After reflecting off the object 8, the light follows the reverse path back to to the in/out fiber 13 of the fiber optic splitter 3. The end of the fiber 13 and the object are exact conjugate planes for only one wavelength, meaning that an image of the end of the in/out fiber is formed on the object at exactly only one wavelength. The other wavelengths will focus either to a plane above the object, or to a virtual plane below the object. Upon reflection and passing back through the system to the in/out fiber 13, only the wavelength that was well-focused on the object is well-focused on the fiber. All of the other wavelengths are poorly focused on the fiber 13, and so will not couple much power into the fiber. Thus the fiber replaces the pinhole or slit used in confocal systems. The optical power coupled back into the in/out fiber 13 depends on the wavelength, which in turn depends on the height of the object (axial distance from the objective lens to the object).

The light that is coupled back into the in/out fiber 13 passes through the fiber optic splitter 3, and then on to the spectrometer 2. The spectrometer quantitatively analyzes the wavelength composition of the returning light and produces a graph similar to those shown in FIG. 1 and FIG. 2. A computer program can then automatically determine at which wavelength, and the corresponding object height, the peak power occurs.

At the same time that the height sensor is measuring the object height at a point on the object, the microscope is forming an image of the object on the CCD camera 12. The source 10, which can be a filtered incandescent source, an LED, or any other source that emits at a wavelength outside the wavelength band received by the spectrometer 2, includes a collector lens (not shown). The collector lens images the source filament onto the entrance pupil of the objective lens 7. The beam splitter 9 reflects half of the source light in the direction of the objective lens, but it must first pass through the chromatic beam splitter 6, as described above. The objective lens 7, along with the image formation lens 11, constitute the microscope and forms a magnified image of the object on the CCD camera 12. Other possibilities include replacing the image formation lens 11 with a standard microscope tube lens and the CCD camera with an eyepiece. In fact, the combination of the image formation lens 11 and the CCD camera 12 can be replaced by any standard microscope image formation assembly, such as eyepieces, cameras, trinocular heads, etc.

TABLE 1

List of components in the integrated microscope and height sensor assembly

| Item # | Description | Principal Specification |
|---|---|---|
| 1 | Lamp | Incandescent halogen bulb |

TABLE 1-continued

List of components in the integrated microscope and height sensor assembly

| Item # | Description | Principal Specification |
|---|---|---|
| 2 | Spectrometer | 500-700 nm wavelength range |
| 3 | Fiber optic coupler/splitter | 3 dB splitter, low directivity |
| 4 | Collimator lens | |
| 5 | Afocal dispersive lens system | Focal length = −800 mm @ 700 nm 800 mm @ 500 nm |
| 6 | Beamsplitter | Reflects 500-700 nm transmits > 750 nm |
| 7 | Microscope Objective lens | |
| 9 | Infrared beamsplitter | 50/50 near-infrared |
| 10 | Infrared LED | 850 nm |
| 11 | Tube lens | F = 180 mm |
| 12 | CCD camera | |

The preferred embodiment described above is best suited to using infinite conjugate objective lenses. In this embodiment, the infinite conjugate regions are the space between the objective lens 7 and the image formation lens 11, and the space between the objective lens 7 and the fiber collimating lens 4. Using an infinite conjugate objective allows flexibility in that the microscope infinite conjugate region does not need to be the same length as that for the height sensor. However, the system can be easily modified to use finite conjugate objective lenses. In this case, the optical path lengths in the microscope and the height sensor would have to be equal.

Figure 5:
FIG. 5 is a view of the axially dispsersive afocal lens system used in the preferred embodiment.
Figure 6:
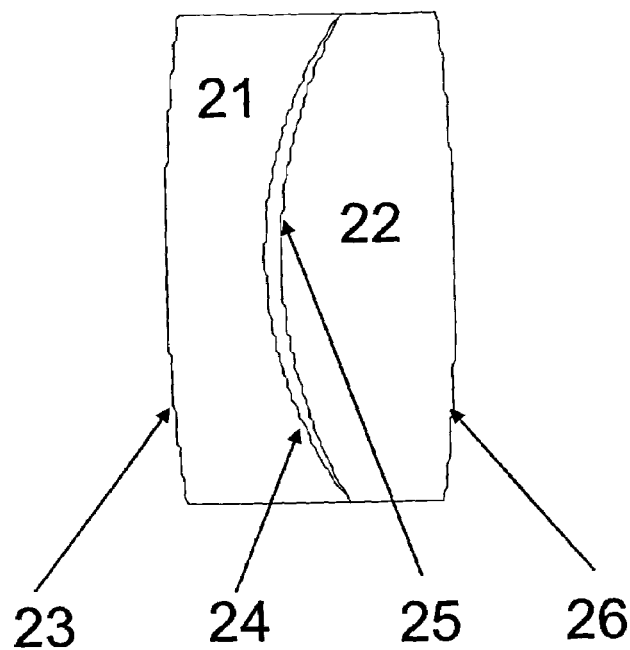
FIG. 6 is a view of an axially dispersive doublet.

A first preferred embodiment of an axially dispersive afocal system is shown in FIG. 5. It is constructed of two doublets, where each doublet is designed to contribute axial dispersion. The spacing between the doublets is approximately twice the focal length of the doublet. An example of a dispersive doublet is shown in FIG. 6. The first, negative element 21 is constructed of a low-index glass, such as BK7, and the second, positive element 22 is constructed of a high-index glass, such as SF6. The curvatures of the elements are chosen so as to provide a predetermined amount of axial dispersion while also correcting for aberrations, such as spherical and coma.

TABLE 2

Prescription for axially dispersive, refractive lens

| Surface | Radius (mm) | Glass | Thickness (mm) |
|---|---|---|---|
| 23 | 86.6503 | N-SF6 | 7.003 |
| 24 | −20.6145 | AIR | 0.64205 |
| 25 | −17.0950 | N-BK7 | 4.008 |
| 26 | −71.9913 | | |

Figure 7:
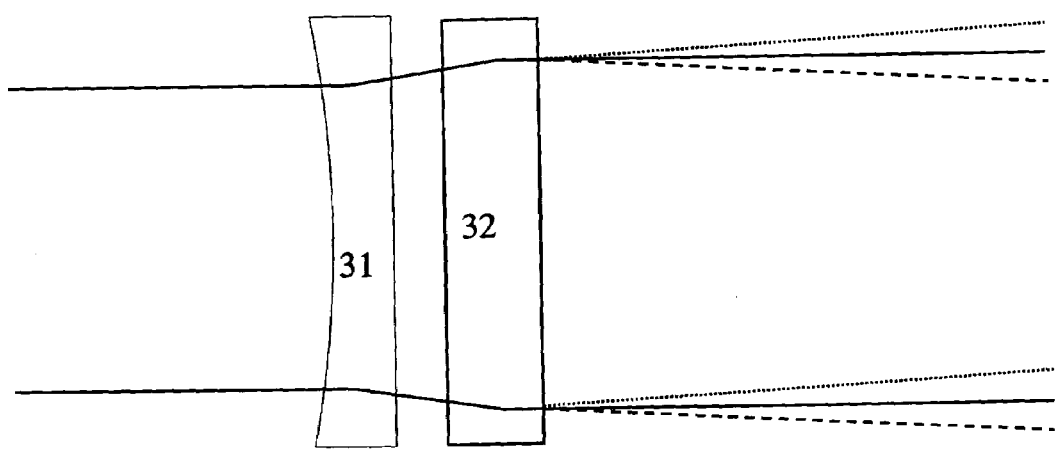
FIG. 7 is a view of a diffractive afocal dispersive lens system.

A second preferred embodiment of an axially dispersive lens is shown in FIG. 7. This lens consists of a diffractive element 32 and a negative refractive element 31. Diffractive elements are well known to have axial dispersion. For example, the first diffracted order of a binary zone plate has a focal length that depends on wavelength according to $$f = \frac{r^2}{\lambda}, \quad (1)$$

where f is the focal length, r is the radius of the first zone, and λ is the wavelength. Since the dispersion of a positive diffractive element is the same as that of a negative refractive element, a single doublet (diffractive element with a negative refractive element) can provide as much dispersion as the two doublets in the first embodiment. In addition, the system is more compact since the two doublets in the first embodiment have a large spacing between them. Because the component is in the infinite conjugate region of the microscope, and the measurement of interest is primarily on axis, this simple design (FIG. 4) is diffraction limited with an OPD less than λ/20 across a 100 nm spectrum.

A specific example of a diffractive afocal dispersive lens system is one where the focal length of the refractive lens 31 is −75 mm, and the radius r of the diffractive lens 32 is 0.221 mm. The diffractive lens can be fabricated by other means, such as holographically.

Table 3 shows measurement height range and spot size of the height sensor when different microscope objectives are used. These values result from calculations using a 50 μm core fiber as the source and receiver pinhole, and the afocal dispersive system shown in FIG. 5

TABLE 3

| Objective Power | Height Range (mm) | Spot Size (μm) |
|---|---|---|
| 5X | 1.88 | 15 |
| 10X | 0.97 | 11 |
| 20X | 0.24 | 5 |
| 50X | 0.039 | 2 |
| 100X | 0.009 | 1 |

Important performance specifications of a profiler are its range of height measurement and its lateral resolution of the measurement. For the present invention, the height measurement range is determined by the combination of the afocal dispersive lens and the objective lens. As described above, the preferred embodiment uses a single afocal dispersive lens with a variety of commercially available objective lenses, and the objective lenses can be mounted for easy substitution. Table 3 lists examples of the height ranges and lateral resolutions (spot size) for different typical objective lenses.

Figure 8:
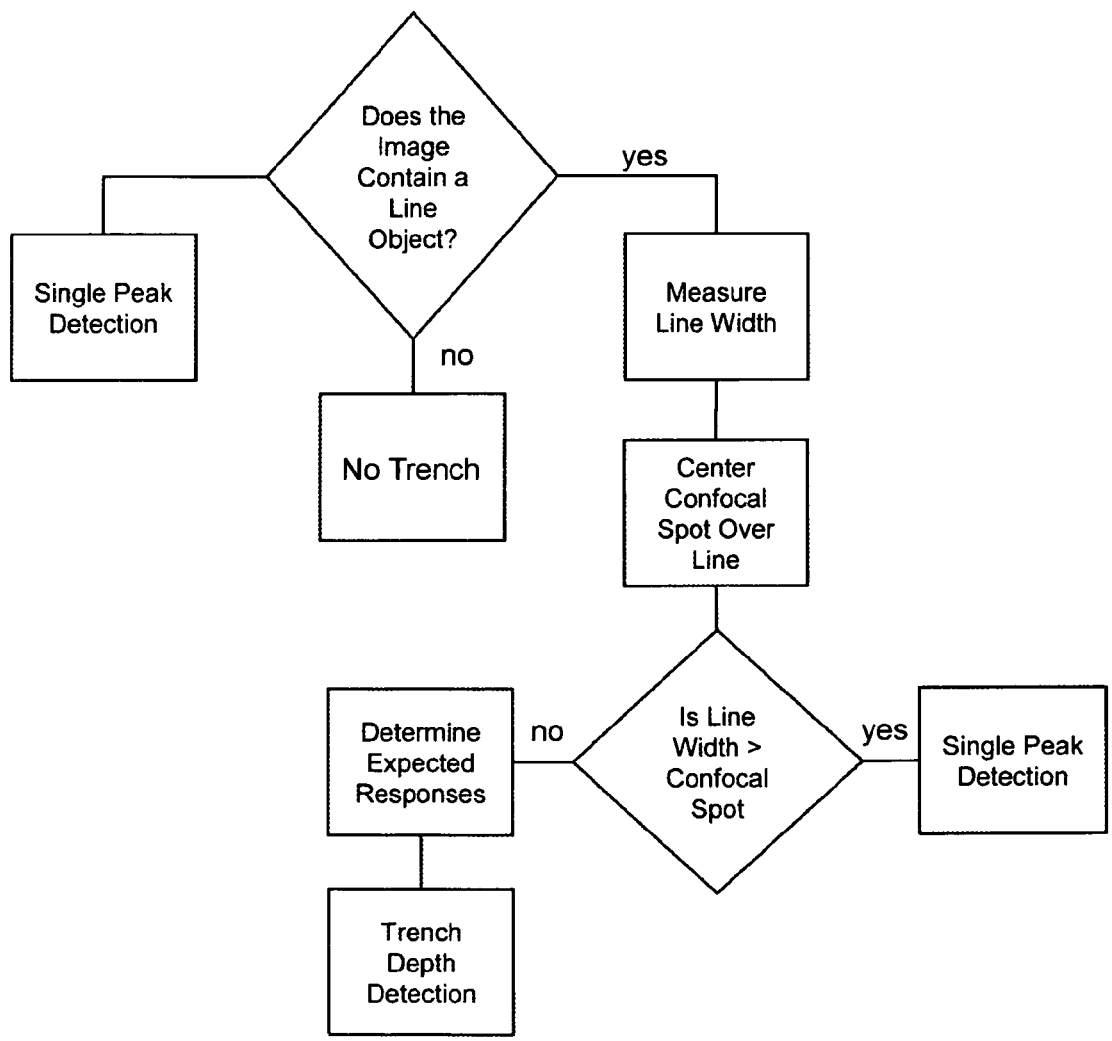
FIG. 8 is a flow chart illustrating a measurement algorithm of the invention.

The following method, as illustrated in FIG. 8, is appropriate for linear trenches.

Figure 1:
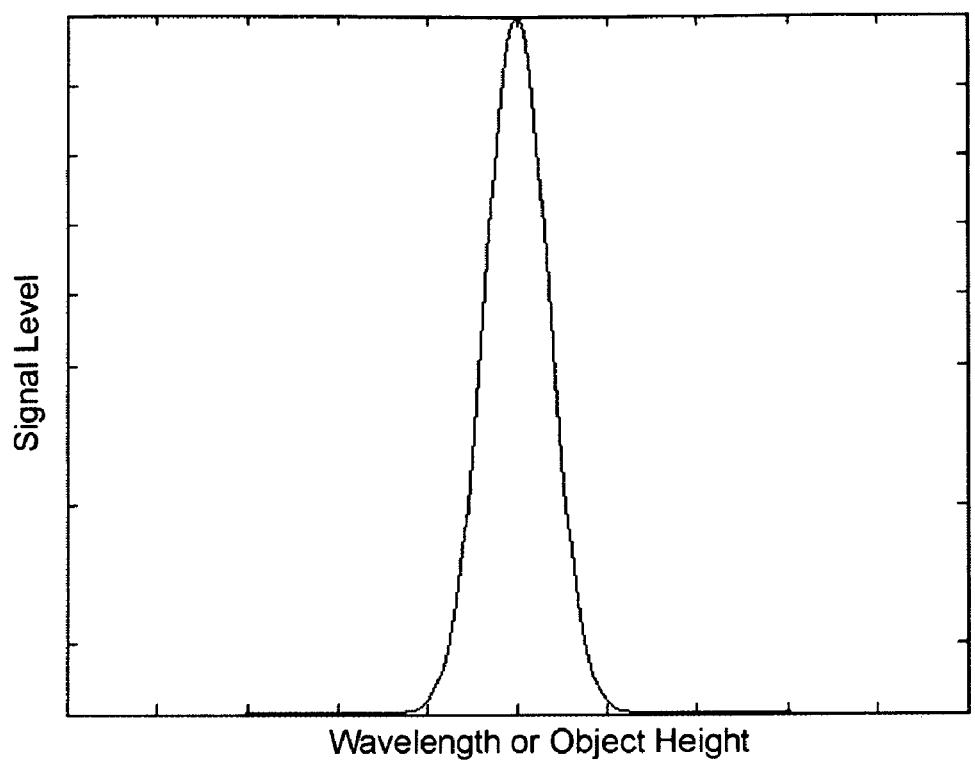
FIG. 1 is a graphical example of how the light level, or signal power, received at the detector aperture depends on the wavelength, or object height, for a typical object surface.

1. Does the image contain a line object? Image processing algorithms available in the current state of the art are satisfactory.
   a) If the image does not contain a line object, then the object does not contain a trench, and a confocal response similar to FIG. 1 is expected. Measure the surface height assuming no trench is present.
   b) If the image does contain a line object, measure the width of the line using currently available measurement algorithms. Continue to step 2).

2. Mechanically center the confocal spot over the line object. Positional feedback from the microscope image, and/or the signal level from the spectrometer, can be used.

Figure 2:
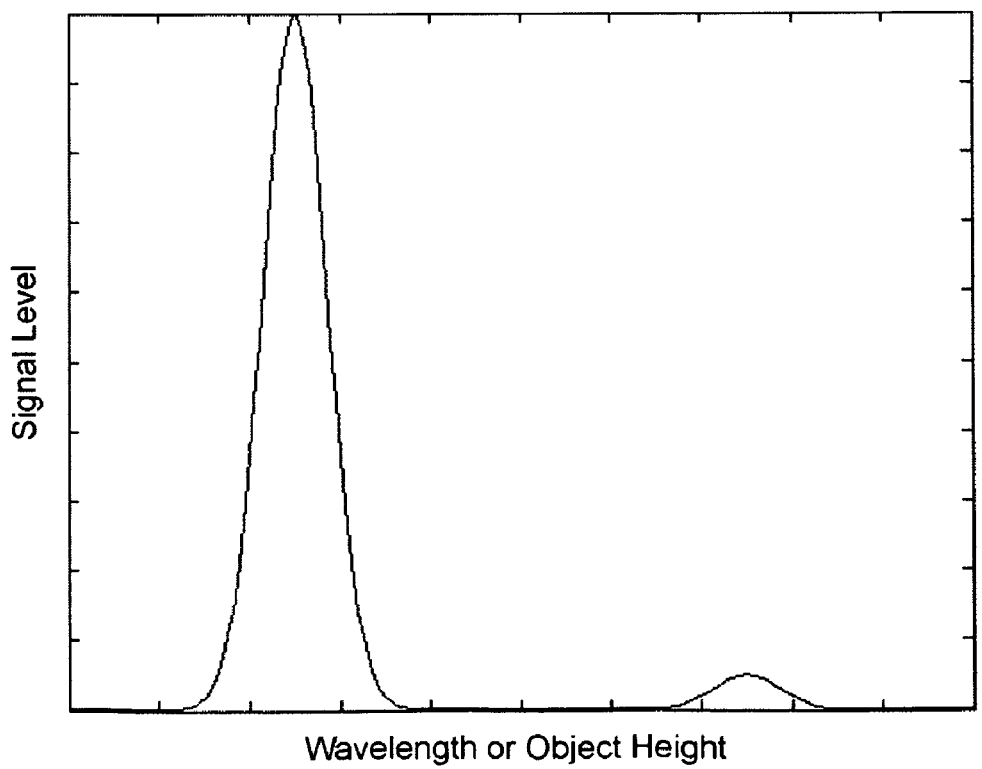
FIG. 2 is a graphical example of how the light level, or signal power, at the detector aperture depends on the wavelength, or object height, for a high aspect ratio trench object. The strong signal corresponds to the top of the trench, and the weak signal corresponds to the bottom of the trench.

3. Is the measured line width significantly greater than the confocal spot size?

a) If it is, then when the confocal spot is centered over the trench, a response similar to FIG. 1 is expected, with the single peak corresponding to the height of the object in the trench. Since the trench is wider than the confocal spot, no light is incident on the area surrounding the trench, and so there is no signal from this area. To measure the depth of the trench relative to the surrounding area, the height sensor can measure the object height inside the trench, as described, and then make a second height measurement of the surrounding area by mechanically moving the confocal spot to that area. The difference between these two measurements provides the trench depth measurement.
   b) If the measured line width is less than the confocal spot size, then a response similar to FIG. 2 is expected. A more precise prototype response can be constructed using the measured line width, along with other a priori information, such as the object's material(s). Continue to step 4).

4. Measure the trench depth by first detecting the position of the large peak, and secondly detecting the position of the weak peak. The difference is the trench depth.

The response shown in FIG. 2 is only a schematic representation, and the exact form of the confocal response for narrow trenches can vary widely, depending on the relationship between the trench width, the confocal spot size, the wavelengths of the light, and the numerical aperture of the focusing objective. For example, the weaker, second peak may not be detectable when the integration time of the spectrometer detector is set so that the level of the first peak is within the detector's dynamic range. The weak second signal may be orders of magnitude weaker than the first strong peak, and their ratio may be greater than the dynamic range of the detector. In this case, two sequential measurements, with different integration times, may be necessary. For example, a short integration time would be used to detect the first strong peak, and a long integration time would be used to detect the second weak peak. In some cases, the second peak may be too weak to distinguish from thermal noise. How the second peak level varies with the trench depth is material and wavelength dependent.

Having thus disclosed embodiments of the invention, it will be apparent to those having skill in the relevant arts that various modifications may be made without substantially deviating from the inventive concepts hereof. By way of example, the confocal response may be measured by confocal systems other than a chromatic confocal system. For example, a laser scanning confocal system, or a confocal system using a Nipkow disc may be used. In these cases, the object must be mechanically scanned axially, and the confocal response for each pixel is recorded. The trench algorithm is then applied to the confocal response from the pixel(s) centered on the trench. However, the chromatic confocal system is preferred because of faster measurement rates due to the elimination of mechanical axial scanning. Nevertheless, it will be understood that the scope hereof is to be limited only by the appended claims and their equivalents.

REFERENCES

1. "Focus-Wavelength Encoded Optical Profilometer" by G. Molesini, G. Pedrini, P. Poggi and F. Quercioli, Optics Communications, Vol. 49, No. 4, p. 229, Mar. 15, 1984.
2. "Method of and Apparatus for Determining the Position Of A Device Relative to a Reference" by D. Gross and C. Dahne, U.S. Pat. No. 4,585,349, 1986.

3. "Confocal Microscopic Device" by T. Scheruebl and N. Czarnetzki, U.S. Pat. No. 6,674,562, 2004.
4. "Confocal Microscope" by Y. Saito and H. Nishida, U.S. Pat. No. 6,188,514, 2001.
5. "Modern Optical Engineering" by W. J. Smith, 3$^{rd}$ Edition, McGraw-Hill, 2000.
6. "Diffractive Lenses for Chromatic Confocal Imaging" by S. LO. Dobson, P. Sun and Y. Fainman, Applied Optics, Vol. 36, No. 20, p. 4744, 1997.
7. "Arrangement for Generating a Defined Longitudinal Chromatic Aberration In The Optical Beam Path Of A Confocal Microscope" by H. G. Baumann, U.S. Pat. No. 6,038,066, 2000.
8. "Confocal Scanning Optical Microscopy And Related Imaging Systems" by T. R. Corle and G. S. Kino, Academic Press, 1996.

We claim:

1. An apparatus for measuring height of selected locations in micrometer and submicrometer surfaces; the apparatus comprising:
   a chromatic confocal height sensor and an optical microscope, said sensor and said microscope having a common optical path and a common objective lens for simultaneously examining substantially the same location on a surface at disparate wavelengths of light.

2. The apparatus recited in claim 1 wherein said sensor comprises an afocal dispersive lens system and a separate objective lens.

3. The apparatus recited in claim 2 wherein said dispersive lens system is refractive and comprises a pair of spaced apart doublet lenses.

4. The apparatus recited in claim 2 wherein said dispsersive lens system is diffractive and comprises a doublet lens having a positive element and a negative element.

5. An apparatus for measuring the depth of trenches in submicrometer surfaces, the apparatus comprising:
   a chromatic confocal height sensor having a light source transmitting light through a fiber optic coupler and through an afocal dispersive lens system and an objective lens onto a submicrometer surface to be measured and having a spectrometer for analyzing the wavelength composition of light returning through said fiber optic coupler to determine at which wavelength peak power of returning light occurs to measure trench depth therefrom;
   a microscope operating at a wavelength not analyzed by said spectrometer and sharing said objective lens by the use of beam splitting, said microscope providing an overview of an area of said surface for aiding in the measurement of trench depth by said height sensor.

6. The apparatus recited in claim 5 wherein said height sensor operates at wavelengths in the visible light spectrum and said microscope operates at a wavelength of non-visible light.

7. The apparatus recited in claim 6 wherein said wavelength of non-visible light is an infrared wavelength.

8. The apparatus recited in claim 5 wherein said microscope comprises a CCD camera for facilitating observation of said area overview.

9. The apparatus recited in claim 5 wherein said afocal dispersive lens system comprises at lease one doublet lens.

10. A method for measuring height characteristics in a submicrometer surface; the method comprising the steps of:
   a) providing a combined chromatic confocal height sensor and microscope for examining a selected location in said surface;
   b) determining whether or not the microscope image of said selected location contains a line object;
   c) if the outcome of step b) is negative, then using said height sensor to detect a peak indication of surface height;
   d) if the outcome of step b) is positive, then measuring the width of the line object and positioning the height sensor at the center of the line object;
   e) determining whether the line width is sufficiently large to generate a single peak indication of trench depth;
   f) if the outcome of step e) is positive, then using said height sensor to detect a peak indication of trench depth; and
   g) if the outcome of step e) is negative, then using measured line width and other available information for carrying out a double peak indication of trench depth.

* * * * *